United States Patent
Fukui et al.

[11] Patent Number: 6,153,081
[45] Date of Patent: Nov. 28, 2000

[54] METHOD OF RECOVERING ANTIMONY AND BISMUTH FROM COPPER ELECTROLYTE

[76] Inventors: Atsushi Fukui, 3-5-3, Nishibara-cho; Naoyuki Tsuchida, 11-11, Hoshigoe-cho; Kouji Ando, 3-5-3, Nishibara-cho, all of Niihama-shi, Ehime-ken 792, Japan

[21] Appl. No.: 08/584,549

[22] Filed: Jan. 11, 1996

[30] Foreign Application Priority Data

Jan. 12, 1995 [JP] Japan .................................... 7-018765
Aug. 28, 1995 [JP] Japan .................................... 7-240475

[51] Int. Cl.[7] ............................... C25C 1/12; C22B 30/00
[52] U.S. Cl. ........................... 205/563; 205/586; 423/87
[58] Field of Search .................... 423/87; 205/563, 205/586, 750; 210/670, 688

[56] References Cited

U.S. PATENT DOCUMENTS 5,316,679  5/1994  Bruening ................................ 210/634
5,366,715  11/1994  Dreisinger ............................. 423/531

FOREIGN PATENT DOCUMENTS 60-211091  10/1985  Japan .
61-110800  5/1986  Japan .
64-8715  2/1989  Japan .

*Primary Examiner*—John Niebling
*Assistant Examiner*—Brendan Mee
*Attorney, Agent, or Firm*—Blank Rome Comisky & McCauley LLP

[57] ABSTRACT

A method of recovering antimony and bismuth from copper electrolyte comprises the steps of immersing a pure copper material in the copper electrolyte, so that the iron ions are reduced from $Fe^{3+}$ ions to $Fe^{2+}$ ions, using a mixture of dilute sulfuric acid and sodium chloride adjusting the acidity or acidic concentration, to selectively elute the bismuth and antimony wherein if the final concentration of bismuth is adjusted to be 0.02 g/l or less in the bismuth election, it is possible to keep the maximum concentration of bismuth in the antimony eluate in the elution of antimony after selective bismuth elution to 0.01 g/l or less.

35 Claims, 5 Drawing Sheets

METHOD OF RECOVERING ANTIMONY AND BISMUTH FROM COPPER ELECTROLYTE

FIELD OF THE INVENTION

This invention relates to an improvement of the method of selectively recovering the impurities Sb and Bi that are included in a copper electrolyte that is used in copper electrolyte refining.

DESCRIPTION OF THE RELATED ART

In conventional copper electrolyte refining, several metals such as gold, silver, nickel, arsenic, antimony, bismuth, etc. are contained in addition to the copper in the anode, and of these, some are eluted out together with the copper from the anode. For example, antimony and bismuth are eluted out together with the copper from the anode, and when they are accumulated in the electrolyte beyond a certain concentration, they precipitate together with the copper, thus lowering the quality of the electrolytic copper. Therefore, in order to keep the concentration of these impurities below a certain level, it is necessary to purify the electrolyte.

The main method used for purifying solution is an electrolytic copper removing method. However the power efficiency of this method is low, and it is also not desirable for the working environment.

In recent years, methods for eliminating these faults have been proposed where sodium sulfite is used in the electrolyte, and by bringing the copper electrolyte into contact with a chelating resin used for selectively adsorbing Sb, Bi and Fe, or a chelating resin for selectively adsorbing Sb, and then by further bringing an eluant into contact with this chelating resin, the Sb and Bi can be separated and recovered from the copper electrolyte (JP Patent First Publications KOKAI no. Shows 60-50192 and KOKAI no. Heisei 2-141541, etc.)

However, the aforementioned regulating method uses hydrochloric acid as the eluant, so with respect to cost there is no difference in the electrolytic copper removing method. Moreover, it is very difficult to maintain the regulated electric potential to the desired value due to e.g. the mixing of air.

The following are some descriptions on the purification of copper electrolyte.

Method of Separating Out the Antimony and Bismuth

Generally, since antimony and bismuth have similar chemical characteristics, they are not easy to separate.

Conventionally, proposed for removing antimony and bismuth from the copper electrolyte are: a method of electrolytic copper removal method in which electrolysis of the copper electrolyte is performed using an insoluble anode made of a material such as lead, so that after copper is removed, slime containing antimony and bismuth is taken out; a method of neutralization in which a material such as sodium bicarbonate is added to the copper electrolyte; a method of hydrosulphide precipitation in which hydrogen sulfide gas is blown into the copper electrolyte, so that antimony and bismuth are removed as hydrosulphide precipitate; and a TANPAN production method in which the copper electrolyte is condensed so as to form copper sulfate crystals, so that antimony and bismuth are removed together with the coprecipitated impurities.

However, in these methods, far more copper is removed than the impurities that are supposed to be removed, thus the efficiency is poor.

Recently, using a purifying method for the copper electrolyte that uses a chelating resin has come into practice.

In selectively eluting the antimony and bismuth from the chelating resin, first the bismuth is eluted, however it is not completely separated, and so there is a problem that a small amount of antimony is mixed in with the eluted bismuth.

If elution is insufficient, the bismuth that remains on the chelating resin is eluted in the following antimony solution, and when the antimony is electrolytically extracted from this eluted solution, the purity of the antimony obtained is lowered. In other words, since there is very little difference in the electrical potential of precipitation for antimony and bismuth, when they are removed by electrolytic extraction, antimony causes a lowering of the purity of the recovered bismuth and vise verse.

Eluant

Normally hydrochloric acid is used as the eluant solution for eluting out the antimony and bismuth that are adsorbed by the chelating resin.

When performing elution using hydrochloric acid, both the antimony and bismuth were removed together at the same time and it is not possible to separate them. Therefore, recovering the antimony and bismuth separately is troublesome in a process for recovering them from the eluate solution.

Moreover, when performing elution using a mixture of dilute sulfuric acid and sodium chloride, the ratio of concentration of antimony and bismuth, Bi/Sb, in the eluate is usually only 1.3, and this small difference makes it difficult to obtain selectivity.

Effects of $Fe^{3+}$

In the process of bringing the copper electrolyte in contact with a chelating resin and adsorbing the antimony and bismuth, then performing elution with dilute hydrochloric acid, if there is $Fe^{3+}$ in the copper electrolyte, it is adsorbed by the chelating resin, and because it can not be eluted out by the dilute hydrochloric acid, it accumulates on the chelating resin and reduces its ability to adsorb the antimony and bismuth.

To prevent adsorption of $Fe^{3+}$, there is a method of immediately passing copper electrolyte drainage over the chelating resin still in a reducing atmosphere of electrolysis, however it lacks flexibility.

Also, there is a method of using a high concentration (6 N or more) of hydrochloric acid to elute out the $Fe^{3+}$ that is adsorbed in the chelating resin when eluting out the antimony and bismuth from the chelating resin, however because of the high cost of hydrochloric acid, it is not economical.

Generation of Chlorine During Electrolytic Extraction

In the process of recovering antimony and bismuth from the eluate solution using electrolytic extraction, normally chlorine is generated on the anode side when performing electrolysis in a chloride bath, and it becomes necessary to treat it for safety.

Reusability of the Eluate

Generally, when removing impurities using an ion-exchange resin, a large amount of solution is produced upon the elution of adsorbed materials, thus large equipment or facilities are required for treating or storing it, increasing the initial investment.

Elution is often performed using a mixture of diluted hydrochloric acid and sodium chloride or a mixture of sulfuric acid and sodium chloride, however neutralization is used when recovering the antimony and bismuth contained in the eluate, so it is difficult to reuse the eluate.

Accordingly, it is desired that a method be established for recovering the metallic antimony and bismuth using electrolytic extraction, after using a chelating resin to adsorb and remove the antimony and bismuth that are dissolved in the copper electrolyte, and selectively eluting out the antimony and bismuth using a mixture of sulfuric acid and sodium chloride.

It is desired to find a way for improving the efficiency of recovering the metallic antimony and bismuth by reusing the eluate in performing elution from the chelating resin, and to furthermore find a way for lowering the investment in equipment by continuously performing elution and electrolytic extraction of metal from the chelating resin after the antimony and bismuth have each been electrolytically extracted from the eluate of the antimony and bismuth that were eluted from the chelating resin.

SUMMARY OF THE INVENTION

An objective of this invention is to provide a method that will eliminate the aforementioned problems and that is capable of regulating the oxidation-reduction potential of the copper electrolyte in the aforementioned method of recovering Sb and Bi so that controlling the concentration of Fe ions contained in the copper electrolyte can be simplified as much as possible.

Another objective of this invention is to provide in one feature for accomplishing the aforementioned objective a method comprising the steps of reducing the $Fe^{3+}$ ions by immersing copper material into the copper electrolyte that contains the impurities, Sb, Bi and Fe, as well as regulating the oxidation-reduction potential of the copper electrolyte to 650 mV or less, bringing the copper electrolyte into contact with a chelating resin, to adsorb the Sb and Bi, and then bringing an eluant solution into contact with the chelating resin to recover the Sb and Bi.

In the method of this invention for separately recovering antimony and bismuth, the antimony and bismuth that are adsorbed by the chelating resin are selectively eluted out by changing the concentration of sulfuric acid to obtain a bismuth eluate and an antimony eluate, and the bismuth eluate is neutralized preferably to a pH of 1, and after the small amount of antimony that is contained in the bismuth eluate solution has been removed, it is electrolytically extracted while for the antimony eluate electrolytic extraction is performed after performing neutralization or hydrolysis.

In the method of this invention, before bringing the copper electrolyte into contact with the chelating resin that has been filled into a column, it is passed over a column filled with copper plate, so that the $Fe^{3+}$ ions contained in the copper electrolyte are reduced to $Fe^{2+}$ ions to prevent adsorption by the resin, then the copper electrolyte is brought into contact with the chelating resin. After the antimony and bismuth have been adsorbed, the column is washed with warm water flowing down from the top, then a mixture of sulfuric acid and sodium chloride is used as the eluant and is passed over the column flowing up from the bottom to perform elution. When doing this, the concentration of the sulfuric acid is changed to selectively recover the antimony and bismuth, and then the metallic antimony and bismuth are recovered from the respective eluate solution using electrolytic extraction.

In the selective elution of bismuth, by making the final concentration of bismuth less than 0.02 g/l, and in the elution of antimony, by making the concentration of bismuth less than 0.01 g/l, it is possible to recover highly pure metallic antimony by performing electrolytic extraction on the eluate solution.

Another objective of this invention according to another feature is to provide a method for selectively recovering antimony and bismuth from a copper electrolyte comprising the following processes:

(1) Iron reduction process that brings the copper electrolyte into contact with metallic copper to reduce the $Fe^{3+}$ iron ions existing in the copper electrolyte to $Fe^{2+}$ ions.

(2) Adsorption process that brings the reduced solution obtained in process (1) into contact with a chelating resin, so that the antimony and bismuth in the electrolyte are adsorbed by the chelating resin.

(3) Washing process in which the chelating resin is washed with warm water.

(4) Bismuth elution process where a 40 to 60° C. bismuth eluant, containing 20 to 30 g/l of sulfuric acid and 120 to 180 g/l of sodium chloride, is brought into contact with the washed chelating resin to elute out the bismuth and obtain a bismuth eluate solution.

(5) Antimony elution process where a 40 to 60° C. antimony eluant, containing 100 to 250 g/l of sulfuric acid and 120 to 180 g/l of sodium chloride, is brought into contact with the chelating resin after the bismuth has been eluted out, to elute out the antimony and obtain an antimony eluate solution.

DETAILED DESCRIPTION OF THE PREFERRED EMBODIMENTS

Figure 1:
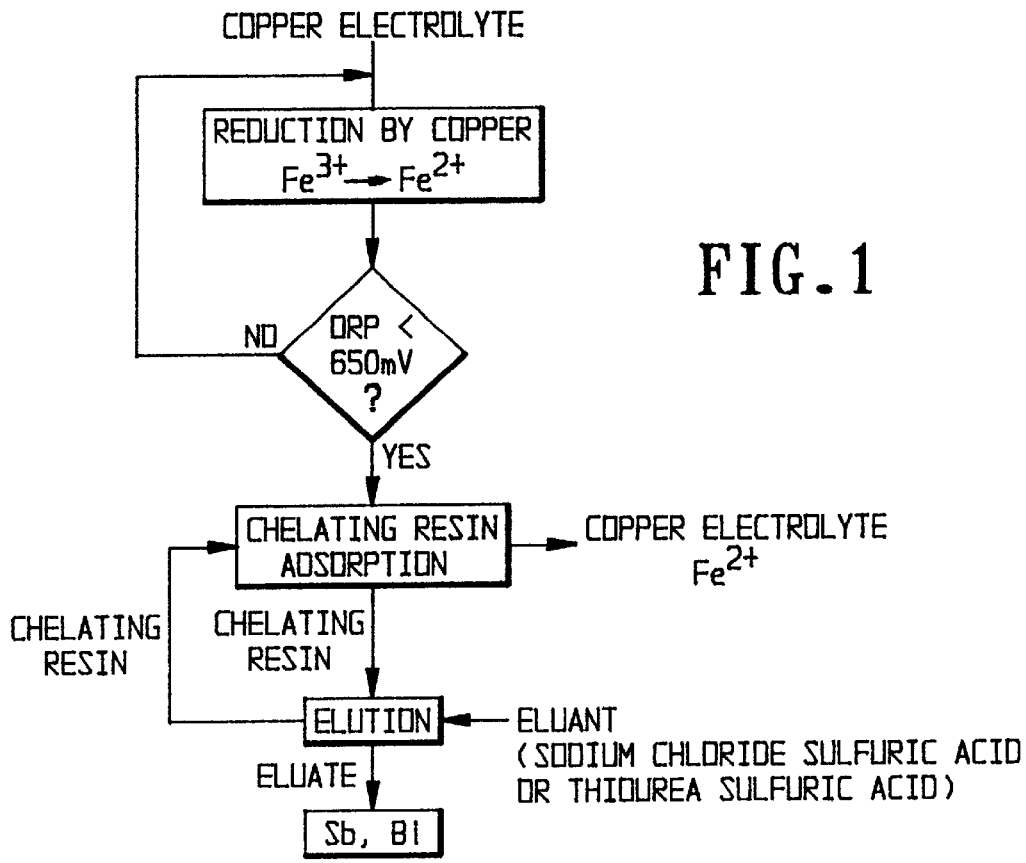
FIG. 1 is a flowchart showing the process of this invention.

A flowchart of the process of an embodiment in this invention is shown in FIG. 1.

In this embodiment, first, when adjusting the oxidation-reduction reduction potential (ORP) of the copper electrolyte that contains the impurities Sb, Bi and Fe so that it is less than 650 mV (with respect to a Ag/Ag Cl reference electrode, it is important that the oxidation-reduction potential be adjusted by immersing copper material into the copper electrolyte. By doing so, the $Fe^{3+}$ ions existing in the copper electrolyte are reduced to $Fe^{2+}$ ions. The Cu that dissolves into the copper electrolyte through performing this reduction is a principal element of the copper electrolyte and not an impurity. Moreover, this Cu does not have any effect on controlling the concentration of the impurity ions contained in the copper electrolyte. From these aspects it is best of the copper material be pure copper.

The shape of the copper material that is immersed into the copper electrolyte can be lumpy, flat, granular, etc.

Next, the copper electrolyte, whose potential has been adjusted as described above, is brought into contact with a chelating resin so that the Sb and Bi are adsorbed by the chelating resin. Since most of the Fe has been reduced to $Fe^{2+}$ ions, the amount of Fe adsorbed is extremely small.

As the chelating resin, it is possible to use the well known Epolas MX-2, manufactured by Miyoshi Oil Co., Duo-lite C-467, manufactured by Sumitomo Chemical Co., Uniseleck UR-3300, manufactured by Unitike etc.

As an eluant for eluting Sb and Bi from the aforementioned chelating resin by which Sb and Bi have been adsorbed, a solution containing sodium chloride and sulfuric acid, or a solution containing thiourea and sulfuric acid can be used. These eluantes are inexpensive and can be easily recycled, thus making it possible to reduce the cost of the purifying process.

In the aforementioned solution containing sodium chloride and sulfuric acid, it is desired that the concentration of the sodium chloride be between 60 and 180 g/l, and even better if it is between 120 to 180 g/l. Also, it is desired that the concentration of the sulfuric acid be between 30 and 200 g/l, and even better if it is between 50 and 200 g/l.

Moreover, in the case of the aforementioned solution containing thiourea and sulfuric acid, it is desired that the concentration of thiourea be between 5 and 20 g/l, and even better if it is between 10 and 20 g/l. Also, it is desired that the concentration of sulfuric acid be between 25 and 300 g/l, and even better if it is between 150 and 200 g/l.

If the temperature of the aforementioned eluant when bringing it into contact with the chelating resin is too low, the eluting reaction of Sb and Bi will be slow. Also, if it is too high, and if the eluant is a solution containing sodium chloride and sulfuric acid, there will be no improvement in the rate of elution of Sb and Bi, especially if the temperature is above 40° C., and if the eluant is a solution containing thiourea and sulfuric acid, the decomposition of thiourea will become great, especially if the temperature is above 50° C. If the eluant is a solution containing sodium chloride and sulfuric acid, it is desired that the temperature of the eluant is between 10 and 60° C., and even better if it is between 30 and 40° C. Also, if the eluant is a solution containing thiourea and sulfuric acid, it is desired that the temperature of the eluant is between 25 and 60° C., and even better if it is between 30 and 50° C.

EXAMPLES 1 TO 4, COMPARATIVE EXAMPLES 1 TO 4

The functional group of the Epolas MS-2 chelating resin, manufactured by Miyoshi Oil Co., was hydrogen type.

Next, 200 g/l of ferric sulfate was dissolved in sulfuric acid to prepare four solutions whose $Fe^{3+}$ concentrations were 0.4 g/l, 0.8 g/l, 1.6 g/l and 2.4 g/l respectively, and each solution was divided in two equal amounts. One of each of the divided solutions was used as was (comparative examples 1, 2, 3, and 4), and into each of the other half of the divided solutions, a copper plate was immersed to lower the oxidation-reduction potential (Example 1, 2, 3, And 4). The potential of the solutions that were used as were was 650 mV, and the potential of the solutions into which a copper plate was immersed was about 580 mV.

The aforementioned chelating resin was immersed into each of the two types of solutions, and stirred for 60 minutes at 40° C.

Next, the chelating resin and solution were separated, and the amount of Fe that was adsorbed by the chelating resin in each of the cases was found. The obtained results are shown in table 1.

TABLE 1

|  | Total Fe (g/l) | Adsorbed Fe (g/l of resin) |
|---|---|---|
| Example 1 | 0.4 | 2.0 |
| Example 2 | 0.8 | 2.7 |
| Example 3 | 1.6 | 4.2 |
| Example 4 | 2.4 | 6.2 |
| Comparative Example 1 | 0.4 | 6.5 |
| Comparative Example 2 | 0.8 | 10.9 |
| Comparative Example 3 | 1.6 | 16.6 |
| Comparative Example 4 | 2.4 | 18.3 |

From table 1 it can be seen that by immersing a copper plate into the copper electrolyte, the oxidation-reduction potential of the copper electrolyte can be effectively reduced, and thus it is possible to suppress the adsorption of Fe.

EXAMPLE 5 the functional group of the Epolas MX-2 chelating resin, manufactured by Miyoshi Oil Co., was hydrogen type.

Next, 20 ml of this resin was immersed in 400 ml of copper electrolyte (Sb 0.55 g/l, Bi 0.52 g/l) and stirred for 60 minutes at 60° C.

After washing this resin with distilled water it was immersed in a 200 ml solution containing 120 g/l of sodium chloride and 100 g/l of sulfuric acid and stirred for 60 minutes at 10° C. to elute the Sb and Bi. The results showed that the recovery rate of Sb and Bi was 52.3% of weight.

EXAMPLES 6 THRU 9

These examples were performed in the same manner as example 5 except that the temperatures of the elution were 25° C., 40° C., 50° C. and 60° C. respectively. The results are shown in table 2.

TABLE 2

|  | Temp. of Eluant (° C.) | Recovery rate of Sb + Bi (% weight) |
|---|---|---|
| Example 5 | 10 | 52.3 |
| Example 6 | 25 | 54.5 |
| Example 7 | 40 | 69.6 |
| Example 8 | 50 | 71.9 |
| Example 9 | 60 | 73.4 |

EXAMPLE 10 THRU 15

These examples were performed at 25° C. in the same manner as example 6, except the concentrations of sodium chloride and sulfuric acid were as shown in table 3. The obtained results are shown in table 3.

TABLE 3

|  | Concentrations in the Eluant (g/l) | | Recovery Rate of Sb + Bi |
|---|---|---|---|
|  | NaCl | $H_2SO_4$ | (% weight) |
| Example 10 | 60 | 100 | 12.2 |
| Example 11 | 120 | 30 | 43.2 |

TABLE 3-continued

|  | Concentrations in the Eluant (g/l) | | Recovery Rate of Sb + Bi |
|---|---|---|---|
|  | NaCl | $H_2SO_4$ | (% weight) |
| Example 12 | 120 | 50 | 53.7 |
| Example 6 | 120 | 100 | 54.5 |
| Example 13 | 120 | 120 | 55.2 |
| Example 14 | 120 | 200 | 80.8 |
| Example 15 | 180 | 100 | 79.0 |

In examples 14 and 15, the concentrations of NaCl were at the saturation level.

From tables 2 and 3 it can be seen that it is best if a solution containing sodium chloride and sulfuric acid is used as the eluant for eluting the Sb and Bi.

EXAMPLES 16 THRU 19

As was done in example 5, after washing in distilled water the chelating resin which was used to adsorbe the Sb and Bi, it was immersed in a 200 ml solution containing 20 g/l of thiourea and 200 g/l of sulfuric acid and stirred for 60 minutes at the temperatures shown in table 4, and the sb and Bi were eluted. The recovery rates of Sb and Bi were as shown in table 4.

TABLE 4

|  | Temp. of Eluant (° C.) | Recovery Rate of Sb + Bi (% weight) |
|---|---|---|
| Example 16 | 25 | 31.5 |
| Example 17 | 40 | 42.1 |
| Example 18 | 50 | 42.1 |
| Example 19 | 60 | 37.9 |

In example 19 the recovery rate of Sb+Bi decreased a little. This is probably because part of the thiourea decomposed.

EXAMPLES 20 THRU 28

These examples were performed in the same manner as example 17 except that the concentrations of thiourea and sulfuric acid were as shown in table 5. The obtained results are shown in table 5.

TABLE 5

|  | Concentrations in the Eluant (g/l) | | Recovery Rate of Sb + Bi |
|---|---|---|---|
|  | Thiourea | $H_2SO_4$ | (% weight) |
| Example 20 | 5 | 200 | 11.4 |
| Example 21 | 10 | 25 | 2.1 |
| Example 22 | 10 | 50 | 5.8 |
| Example 23 | 10 | 100 | 13.4 |
| Example 24 | 10 | 150 | 21.5 |
| Example 25 | 10 | 200 | 30.2 |
| Example 26 | 10 | 300 | 20.6 |
| Example 27 | 15 | 200 | 36.5 |
| Example 17 | 20 | 200 | 42.1 |
| Example 28 | 20 | 300 | 42.6 |

From tables 4 and 5 it can be seen that it is best if a solution containing thiourea and sulfuric acid is used as the eluant used for eluting the Sb and Bi.

EXAMPLE 29

100 ml of Duo-lite C-467 chelating resin, manufactured by Sumitomo Chemical Co., was filled into a column, and the functional group of that chelating resin was hydrogen type.

Next, a copper plate weighing approximately 50 g was immersed in the copper electrolyte to reduce the $Fe^{3+}$ ions to $Fe^{2+}$ ions, and the electrolyte (oxidation-reduction potential of 580 mV), in which the concentration of Sb was 0.55 g/l, the concentration of Bi was 0.52 g/l and the concentration of $Fe^{2+}$ was 0.4 g/l, was passed through the aforementioned column. The required flow conditions were: a required flow temperature of 60° C., a required flow speed of SV 10 (10 l/hr per 1 liter of resin), and a volume of required flow of BV 100.

Furthermore, distilled water with a required flow volume of BV 20 was passed through the column at 60° C. to wash the aforementioned chelating resin and to completely remove the copper electrolyte.

Then, a solution containing 10 g/l of thiourea and 200 g/l of sulfuric acid was passed through the column. The required flow conditions were: a required flow temperature of 40° C., required flow speed of SV 3, and a volume of required flow of BV 15. The results showed that the recovery rate of Sb+Bi was 19.8% weight.

EXAMPLE 30

100 ml of Epolas MX-2 chelating resin, manufactured by Miyoshi Oil Co., was filled into a column and the functional group of the chelating resin was hydrogen type.

Next, a copper plate weighing approximately 50 g was immersed in the copper electrolyte to reduce the $Fe^{3+}$ ions to $Fe^{2+}$ ions, and the copper electrolyte (oxidation-reduction potential of 580 mV), in which the concentration of Sb was 0.55 g/l, the concentration of Bi was 0.52 g/l and the concentration of $Fe^{2+}$ was 0.4 g/l, was passed through the aforementioned column. The required flow conditions were: a required flow temperature of 60° C., a required flow speed SV 10 (10 l/hr per 1 iter of resin), and a volume of required flow of BV 100 (100 liters per 1 liter of resin).

Furthermore, distilled water with a volume of required flow of BV 20 was passed through the column at 60° C. to wash the aforementioned chelating resin and to completely remove the copper electrolyte.

Then, a solution containing 180 g/l of sodium chloride and 100 g/l of sulfuric acid was passed through the column. The required flow conditions were: a required flow temperature of 40 C., required flow speed of SV 3, and a volume of required flow of BV 15. The results showed that the recovery rate of Sb+Bi was 91.6% weight.

Figure 2:
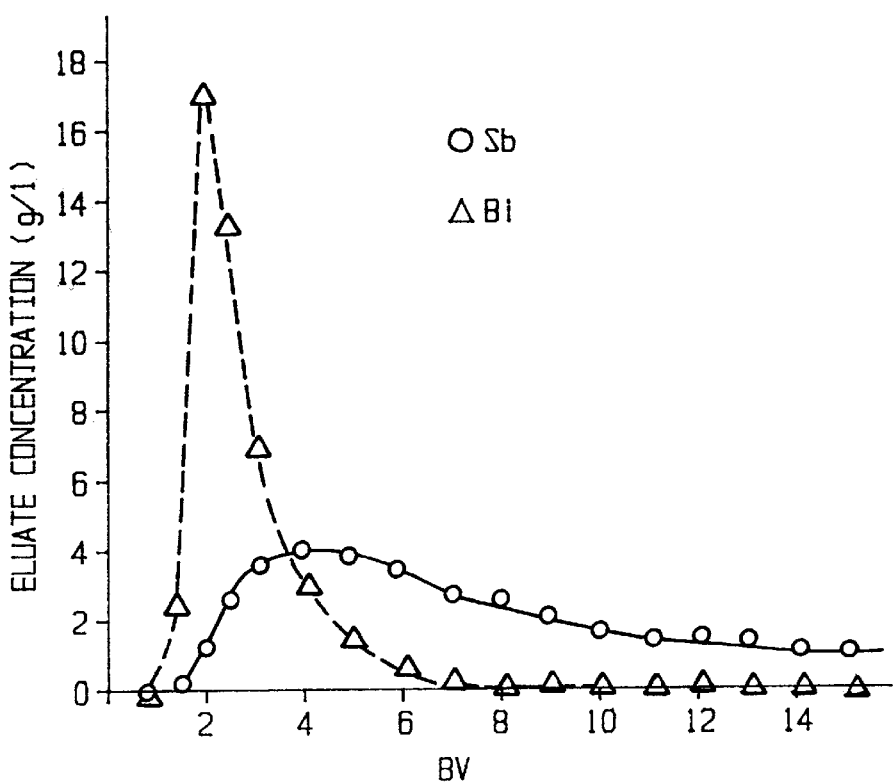
FIG. 2 is a graph (elution curve) that plots the relationship between the volume of passed solution (BV) and the concentration of the eluate to show the status of elution of Sb and Bi using a mixture of sodium chloride and sulfuric acid.

The concentration of eluted Sb and Bi for a required flow volume up to BV 15 are shown in FIG. 2.

EXAMPLE 31

100 ml of Epolas MX-2 chelating resin, manufactured by Miyoshi Oil Co., was filled in a column, and the functional group was hydrogen type. 200 g/l of ferric sulfate was dissolved in sulfuric acid, to create a synthetic $Fe^{3+}$ ion solution, and after a copper plate weighing approximately 50 g was immersed in the solution to reduce the $Fe^{3+}$ ions to $Fe^{2+}$ ions, it was passed through the column, and antimony and bismuth were adsorbed by the chelating resin.

Next, the resin was washed with distilled water at 60° C. until the flow was BV 20 (20 l/l resin) in order to completely remove all of the copper electrolyte, then a mixture of 10 g/l of thiourea and 200 g/l of sulfuric acid were passed through the column at 40° C. where the required flow speed was SV 3 (3 l/h/l resin).

Figure 3:
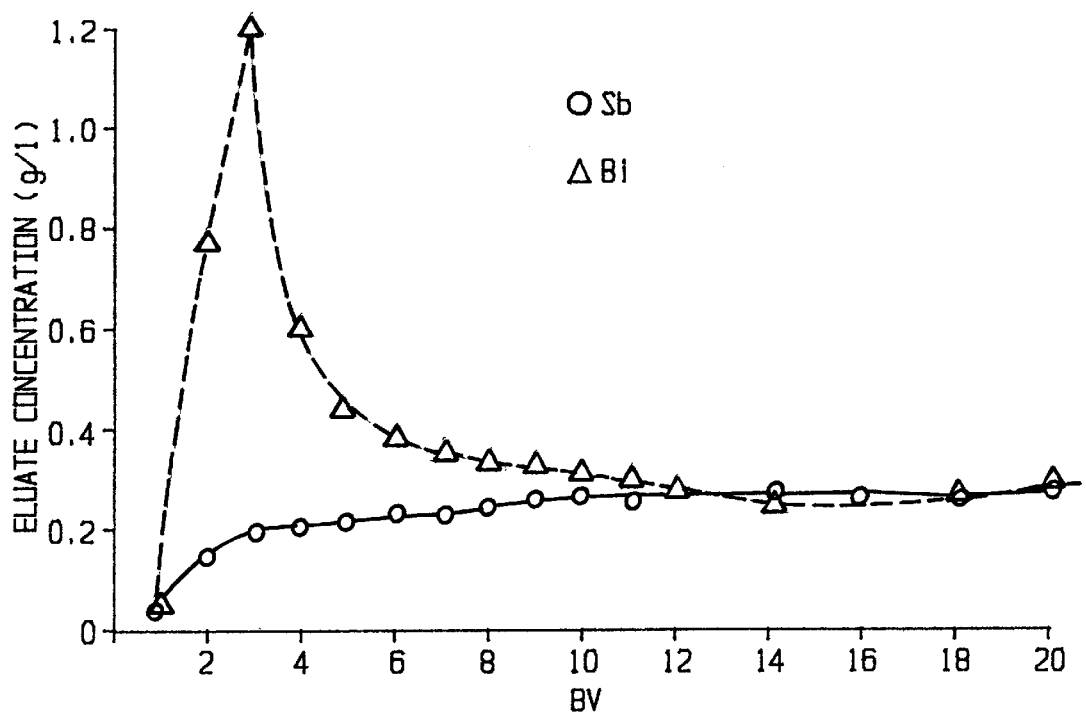
FIG. 3 is a graph (elution curve) that plots the relationship between the volume of passed solution (BV) and the concentration of eluate to show the status of elution of Sb and Bi using a mixture of thiourea and sulfuric acid.

The volume of required flow was BV 20 (20 l/l resin), and the recovery rate of antimony and bismuth was investigated. The results are shown in FIG. 3. In other words, FIG. 3 shows the concentrations of the antimony and bismuth in the eluted solution until the volume of required flow of the mixture at 40° C. of 10 g/l of thiourea and 200 g/l of sulfuric acid reached BV 20. As can be seen in FIG. 3, antimony and bismuth were eluted.

EXAMPLES 32 THRU 35, COMPARATIVE EXAMPLES 5 THRU 8

The functional group of UR-3300 chelating resin, manufactured by Unitika Ltd, was hydrogen type.

Ferric sulfate was dissolved in 200 g/l sulfuric acid to create a synthetic $Fe^{3+}$ ion solution, and it was divided into two parts. A copper plate was placed in one of the parts of the synthetic solution, and the other part was used as was. The chelating resin was put into the synthetic solutions at 40° C., and stirred for 60 minutes. Four types of synthetic solution were created where the Fe ion concentrations were, 0.4 g/l (example 32, comparative example 5), 0.8 g/l (example 33, comparative example 6), 1.6 g/l (example 34, comparative example 7), and 2.4 g/l (example 35, comparative example 8).

Figure 4:
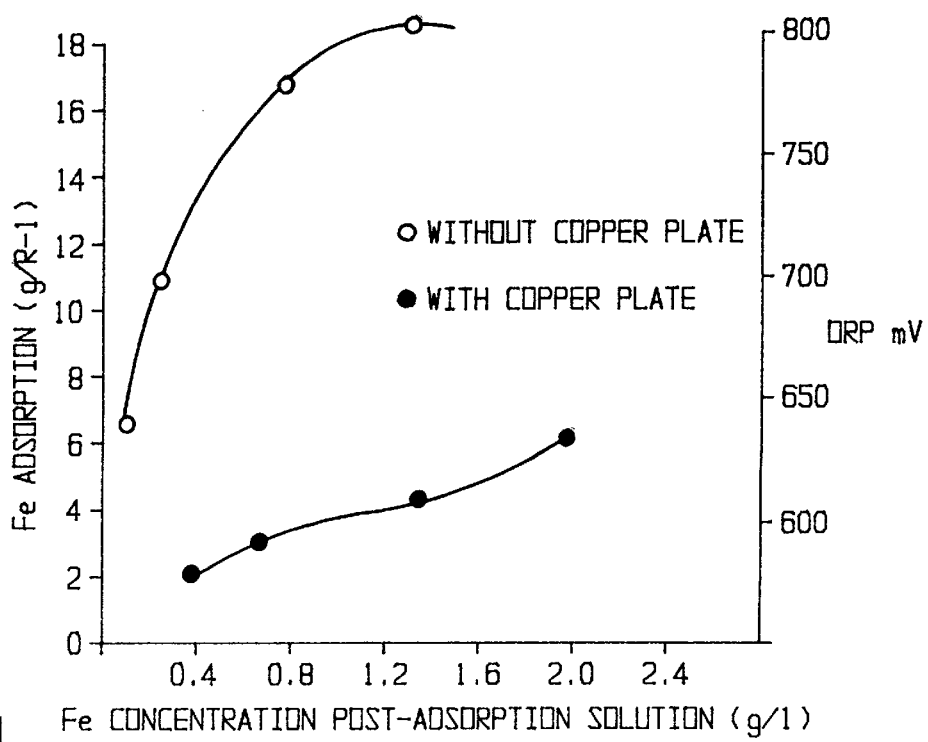
FIG. 4 is a graph showing the amount of adsorption, the oxidation-reduction potential and Fe concentration after adsorption by a chelating resin of copper electrolytes whose Fe concentrations were 0.4 g/l, 0.8 g/l, 1.6 g/l and 2.4 g/l, for the cases where a copper plate was and wasn't immersed in the electrolyte in order to show the results of immersion of a copper plate in the copper electrolyte.

FIG. 4 shows the amount of adsorption (g/l resin) of UR-3300 and the oxidation-reduction potential (OPR) values and Fe ion concentrations after adsorption for when a copper plate was (examples) and wasn't (comparative examples) placed in the solution. As can be seen from FIG. 4, by using the copper plate, it was possible to suppress the adsorption of Fe ions by the chelating resin.

In other words, when the copper plate was placed into the solution, the concentration of Fe ions in the solution after adsorption was reduced only by an amount of 0.3 g/l or less than the initial concentration (remaining as $Fe^{2+}$), so that the amount of adsorption of $Fe^{3+}$ in the chelating resin was less than 6 g/l of resin or less, while when the copper plate wasn't placed into the solution, the amount of adsorbed Fe ions that were adsorbed by the chelating resin increased after adsorption, so that the concentration of the Fe ions was greatly decreased.

Also, if the copper plate was not placed into the solution, it can be seen from the adsorption results that the oxidation-reduction potential (ORP) was greater thatn 650 mV even when the concentration of Fe ions was nearly 0. It should be noted that when a chelating resin in which the adsorption of Fe ions had been suppressed was placed in the eluent and stirred, the recovered metals were indeed Sb and Bi, and there was very little Fe.

In the method of recovering Sb and Bi from a copper electrolyte of this embodiment as mentioned above, by immersing pure copper material in the copper electrolyte, the iron ions in the copper electrolyte that will come in contact with the chelating resin are reduced from $Fe^{3+}$ ions to $Fe^{2+}$ ions, therefore it becomes very simple to control the concentration of impurity ions contained in the copper electrolyte. Moreover, it is possible to recover Sb and Bi from the copper electrolyte very efficiently.

Figure 5:
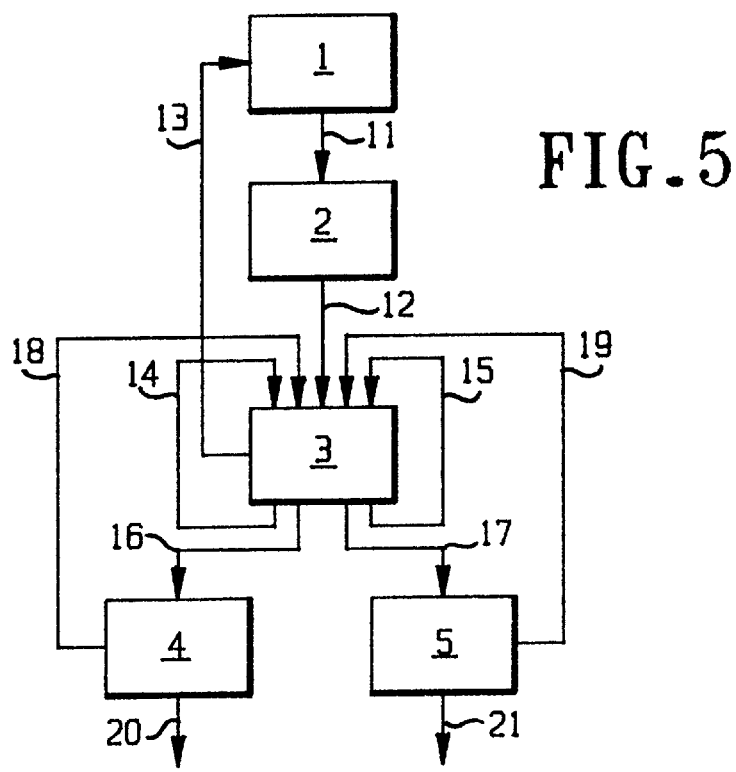
FIG. 5 is a flowchart of the recovery process of antimony and bismuth of this invention.

FIG. 5 shows the processes used in the examples in another feature of the present invention.

The processes related to this embodiment comprises, a copper electrolysis process 1, electrolyte reduction process 2, chelating resin adsorption process 3, bismuth electrolytic extraction process 4 and antimony electrolytic extraction process 5.

The copper electrolyte 11 that is drained from the copper electrolysis process 1 becomes the post-reduction electrolyte in the electrolyte reduction process 2, and in the chelating resin adsorption process 3, bismuth and antimony are adsorbed in a chelating resin tower, and the post-adsorption electrolyte 13 after the antimony and bismuth have been removed by adsorption is returned to the copper electrolysis process 1.

In the chelating tower that adsorbed the antimony and bismuth, the chelating resin is washed and then the bismuth is eluted first. At this time, in one state, the eluate 16 having a high concentration of bismuth is sent to the bismuth electrolytic extraction process 4, and the eluate 14 having a low concentration of bismuth is return to the chelating resin tower.

After bismuth elution has finished, elution of the antimony is performed. At this time, in one state, the eluate 17 having a high concentration of antimony is sent to to the antimony electrolytic extraction process 5, and the eluate 15 having a low concentration fo antimony is returned to the chelating resin tower.

In different states, it is possible that electrolytic extraction may be performed for the eluate having low concentrations of bismuth and antimony as well.

Metallic bismuth powder 20 and metallic antimony powder 21 are obtained from electrolytic extraction. Also, the electrolytic extraction drainages 18 and 19, are returned to the chelating resin adsorption process 3.

In the electrolyte reduction process 2, $Fe^{3+}$ is reduced. In other words, when the antimony and bismuth existing in the copper electrolyte are adsorbed by the chelating resin, if there are any $Fe^{3+}$ ions existing in the copper electrolyte, it is adsorbed by the chelating resin and the amount of antimony and bismuth that can be adsorbed is greatly reduced. Also, to elute the $Fe^{3+}$ ions that are adsorbed by the chelating resin, a highly concentrated hydrochloric acid is required. Therefore it is necessary to prevent the $Fe^{3+}$ ions from being adsorbed by the chelating resin. In other words, since $Fe^{2+}$ ions are not adsorbed by the chelating resin, before passing the electrolyte through the chelating resin, it is brought into contact with metallic copper that has been filled into a column to reduce the $Fe^{3+}$ ions to $Fe^{2+}$ ions, then the electrolyte is passed through the chelating resin, preventing $Fe^{3+}$ ions from adsorbing to the resin.

The water used for washing the chelating resin after adsorption is passed over the resin down from the top of the column so that it constantly forces heavier electrolyte downward Due to the difference in specific gravity in comparison with the electrolyte, so that all of the electrolyte is removed. In this operation it is possible to efficiently remove all of the electrolyte inside the column.

The eluant used for eluting the antimony and bismuth adsorbed by the chelating resin is a mixture of sulfuric acid and sodium chloride, therefore its specific gravity is much larger than that of the water remaining inside the column, so that if the amount of flow is small, when it is passed through the column from the top, there will be maldistribution in flow inside the column. Therefore the eluant should be passed through the column up from the bottom in order that it forces the lighter water upward. By this operation, it is possible to effectively prevent the water used for washing from mixing with the eluant inside the column.

Generally it is assumed that the antimony and bismuth that are adsorbed by the chelating resin filled inside the column are adsorbed in the form of $SbO^+$ and $BiO^+$, so in regards to elution, the adsorbed $SbO^+$ and $BiO^+$ are removed in the chloride complex of $SbCl_4^-$ and $BiCl_4^-$, while $H^+$ is adsorbed at the adsorption site on the chelating resin.

In this invention, in the elution of bismuth from the chelating resin, a low concentration of sulfuric acid is used. This is because there is a difference in the bonding strength between antimony and bismuth to the chelating resin, and by using a mixture of dilute sulfuric acid and sodium chloride, it is possible to selectively elute the bismuth which has a weaker bonding strength.

This invention, which uses a mixture of dilute sulfuric acid and sodium choride, is based on the discovery that the selectivity of the elution of bismuth and antimony depends on the concentration of $H^+$. In other words, the $Cl^-$ ions were fixed by using sulfuric acid and sodium chloride, and by adjusting the acidity or acidic concentration, it was possible to selectively elute the bismuth with all of the antimony remained fixed to the chelating resin.

For example, if salt water (naCl: 120 g/l) having a concentration of sulfuric acid of 20 to 30 g/l is used, the weight ratio Bi/Sb of the eluate becomes greater than 10 and the selectivity becomes high. On the other hand, if the concentration of sodium chloride is kept fixed, and the concentration of sulfuric acid is increased to 60 g/l, the weight ratio of Bi/Sb of the eluate becomes 4, and selectivity is lsot.

Also, if salt water having a low concentration of sulfuric acid is used, in the selective elution of bismuth, the concentration of antimony in the bismuth eluate is fixed at 0.2 to 0.6 g/l regardless of the volume of required flow of eluate and becomes balanced, and the antimony will not elute any more and remain in the chelating resin.

It is desired that the bismuth eluate be neutralized to pH 1. This is because, it is possible to lower the amount of antimony contained in the recovered bismuth when electrolytic extraction is performed after the antimony is removed by neutralizing the bismuth eluate. Separation is not completely perfect, and if there is a small amount of antimony mixed in with the bismuth eluate, that antimony becomes an impurity during the process of recovering the bismuth from the bismuth eluate.

In the bismuth elution process, the reason that elution is performed until the bismuth concentration becomes 0.02 g/l or less is so that the bismuth at such a lower concentration does not become a problem during the following antimony recovery process. If the bismuth elution is inadequate, during the following antimony elution, the remaining bismuth is eluted, so that the concentration of bismuth in the antimony eluate becomes high.

The volume of required flow for selective bismuth elution is BV 15. In selective bismuth elution, after the volume of required flow of BV 6 to 7 or more, or in other words, if the concentration of bismuth in the bismuth eluate is equal to or less than 0.5 g/l and the weight ratio Sb/Bi is 1 or less, the eluate is repeatedly used as is for eluant in the chelating resin adsorption process 3, and the elution of antimony is further suppressed.

On the other hand, with respect to the eluate in the first half of the selective elution of bismuth, that is the eluate before the volume of required flow becomes BV 6, if the concentration of bismuth drops to 0.02 g/l or less during the bismuth electrolytic extraction process 4, it is possible to reuse it in the later half of the selective bismuth elution in the chelating resin adsorption process 3, or in other words, in the portion after the volume of required flow of BV 6 or more.

An important point in the elution of antimony after selective elution of bismuth is that the concentration of bismuth in the antimony eluate be 0.01 g/l or less. This concentration of bismuth can basically be achieved by adjusting the volume of required flow, however if the volume of required flow is increased, the amount of antimony that is eluted during selective elution of bismuth increases, as well as resulting in the economical disadvantage of having to enlarge the facilities for treating and storing more eluate.

In this invention, if the concentration of bismuth is adjusted to be 0.02 g/l or less as mentioned above with a volume of required flow of BV 14 to 15 in the bismuth electrolytic extraction process 3 by optimizing the eluant preparation, required flow speed (SV) and required flow temperature, it is possible to keep the maximum concentration of bismuth in the antimony eluate in the elution of antimony after selective bismuth elution to 0.01 g/l or less.

In the elution of antimony after the selective bismuth elution, the antimony is eluted using an eluant of salt water whose concentration of sulfuric acid has been increased to 200 to 250 g/l, therefore, all of the antimony and bismuth remaining on the chelating resin is eluted. Also, as mentioned above, in the selective bismuth elution, if the concentration of bismuth in the bismuth eluate is kept to below 0.02 g/l and if the concentration of bismuth in the antimony eluate is kept to below 0.01 g/l, then it is possible to recover highly pure metallic antimony by performing electrolytic extraction of the antimony eluate.

In this invention, during recovery of the antimony and bismuth by electrolytic extraction from the eluates, the anode and cathode are separated from each other by a positive ion exchange film. This makes the anode side acidic with sulfuric acid, so that inexpensive lead can be used, thus making it possible to perform electrolysis preventing corrosion and elution of anode, and without the production of chlorine. If electrolysis is performed with the anode and cathode in the same hydrochloric acid, it is necessary to use an insoluble anode such as DSA that is capable of withstanding chlorination, and to process the chlorine produced.

Electrolytic extraction of bismuth is different then the electrolytic extraction of antimony in that there is a trend for the current efficiency to increase as the temperature of electrolysis becomes high. Also, the current density for bismuth msut be increase a little because of the overvoltage of the electrolytic deposition, and a current density of 20 to 50 A/m$^2$ is thought to be optimal. Therefore, constant-current electrolysis at high temperature is best for electrolytic extraction of bismuth.

In the electrolytic extraction process of antimony, there is no change in the current with constant-current electrolysis even if the concentration of antimony in the eluate drops, therefore if current continues to flow as is, the temperature of electrolysis increases and the current efficiency decreases. Also, it is difficult to determine when electrolysis has finished, and it is necessary to constantly watch the concentration of antimony in the eluate.

If electrolysis is performed at a constant voltage, hydrogen is generated from the cathode if the concentration of antimony in the eluate drops and the voltage increases and the current stops flowing, therefore it is easy to determine when electrolysis has finished and the drop in current efficiency can be prevented.

In the electrolytic extraction of antimony, the trend that can be seen of a drop in current efficiency is thought to be due to the fact that the antimony eluate has a high concentration of sulfuric acid of 200 to 250 g/l, and that the deposited antimony is dissolved again. Therefore, it is necessary that electrolysis be performed at low temperature, with 10 to 25° C. being the best, and low-voltage electrolysis at low temperature is best for electrolytic extraction of antimony.

In the elution of antimony, if electrolytic extraction is performed for the antimony eluate with a high concentration of antimony, while the antimony eluate with a low concentration of antimony is returned as eluant to the chelating resin, only a single-stage electrolysis tank is required for the electrolytic extraction.

However, if a solution containing antimony is reused as an eluant, the amount of antimony remaining on the chelating resin increases, and it badly affects the adsorption balance.

Accordingly, it is better if electrolytic extraction is performed on the eluate with low concentration of antimony, where a two-stage cascade with good current efficiency is recommended for electrolysis.

Since the concentration of antimony is high in the first stage of the cascade, it is possible to perform constant-voltage electrolysis at a comparatively high voltage.

The drainage from the first stage and the antimony eluate with low concentration of antimony is then put into the second stage of the cascade. Because the concentration of antimony is low, the current remains low even if constant-voltage electrolysis is performed at high voltage. Therefore, it is recommended that electrolysis be performed efficiently by performing constant-voltage electrolysis at a low voltage.

Using this method, the antimony eluate can be sent directly and continuously to two electrolysis tanks, and the solution that is drained from the second-stage electrolysis tank can be reused directly for the eluant, thus the retained amount of solution is less than when compared with the normal ion exchange method.

Figure 6:
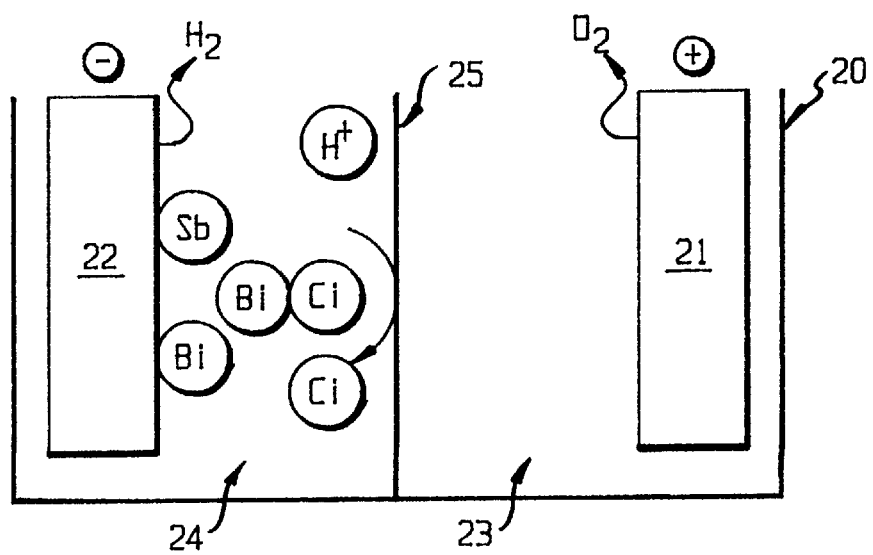
FIG. 6 is an explanatory drawing of the electrolysis tank used in the examples of this invention.

FIG. 6 shows an outline drawing of the bismuth electrolysis tank 20 that is used in the electrolytic extraction process.

This electrolysis tank 20 has a lead anode plate 21 and a niobium or titanium cathode plate 22, and it is divided with a positive ion exchange film 25, with sulfuric acid being kept on the anode side, and bismuth eluate 24 being kept on the cathode side. $H^+$ ions can pass through the positive ion exchange film 25, however $Cl^-$ ions cannot.

In this invention, the reason that a niobium or titanium cathode is used is that in hydrochloric acid it withstands chlorination and corrosion very well, and because electrode-posited matter can be easily removed from it.

Also, the oxides on the surface of these electrodes can function as a catalyst in electrolytic deposition.

EXAMPLE 36

One liter of chelating resin (Epolas MX-2, manufactured by miyoshi Oil Co.) is filled into a column, and a copper electrolyte, whose concentration of Sb is 0.5 to 0.6 g/l and concentration of Bi is 0.3 to 0.4 g/l, is passed at 60° C. through a column filled with metallic copper to reduce the Fe ions, then after the chelating resin having adsorbed Sb and Bi is washed with BV3 of warm water, a mixture of sulfuric acid and sodium chloride is used and is passed through the column down from the top of the column in order to selectively elute the Bi. The conditions of elution and the results are shown in tables 6-1 and 6-2.

As can be seen in tables 6-1 and 6-2, when the concentration of sulfuric acid was 60 g/l or more, antimony is eluted, so that the selectivity between antimony and bismuth was lost, and bismuth could not be selectively eluted. Also, even though the concentration of sulfuric acid is low at 30 g/l, it was possible to selectively elute the antimony if the concentration of sodium chloride was 180 g/l. The best concentration of the eluant is 30 g/l of sulfuric acid and 120 g/l of sodium chloride, but if elution is performed with a solution whose concentration of sulfuric acid is 60 g/l or less and whose concentration of sodium chloride does not exceed 180 g/l, elution of antimony can be suppressed and it is possible to selectively elute the bismuth.

EXAMPLE 37

After adsorbing the antimony and bismuth to the resin in the same manner as was done in example 36, in order to selectively and efficiently elute both the antimony and bismuth, a combination of elution conditions for bismuth and antimony were used, and by passing a mixture of sulfuric acid and sodium chloride down from the top of the column, bismuth was eluted first then followed by the elution of antimony. The conditions of elution and the results are shown in tables 7-1 and 7-2, in the elution of antimony, even with a concentration of sulfuric acid of 200 g/l, if the concentration of sodium chloride is low at 60 g/l, the amount of antimony that is eluted decreases. In the elution of antimony, it is allright if the conditions allow for all of the antimony and bismuth remaining on the chelating resin to be eluted, therefore it is best if elution is performed with a high concentration of sulfuric acid and sodium chloride. However, the solution is limited to 250 g/l of sulfuric acid and 150 g/l of sodium chloride, and if the concentrations are higher than this, the sodium chloride will reach the state of saturation and be precipitated out. In the elution of antimony, for a concentration of 200 to 250 g/l of sulfuric acid, it is best if the concentration of sodium chloride be 120 to 150 g/l, and in such a case the rate of elution of antimony was seen to be 80% or more.

EXAMPLE 38

After adsorbing the antimony and bismuth to the resin in the same manner as was done in example 36, using the same elution process as was used in example 36, the bismuth was eluted with an eluate having a concentration of 30 g/l of sulfuric acid and 180 g/l of sodium chloride that passed through the column from the bottom at SV of 1.5 and until BV was 15.

Figure 7:
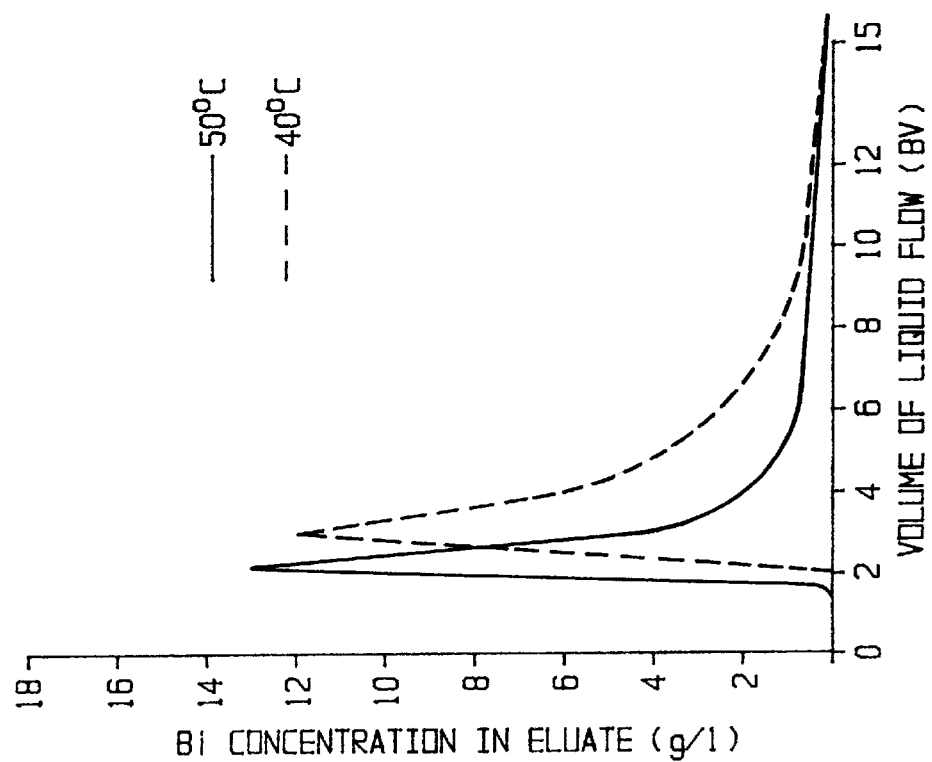
FIG. 7 is a graph that plots the relationship between the required volume of passed solution (BV) and concentration of bismuth eluate when a mixture of 30 g/l of sulfuric acid and 180 g/l of sodium chloride is used and passed down from the top of the column at 40° C. and at 50° C.

FIG. 7 shows elution curves for comparison obtained by passing the eluate from the top of the column at 40° C. and 50° C.

Figure 8:
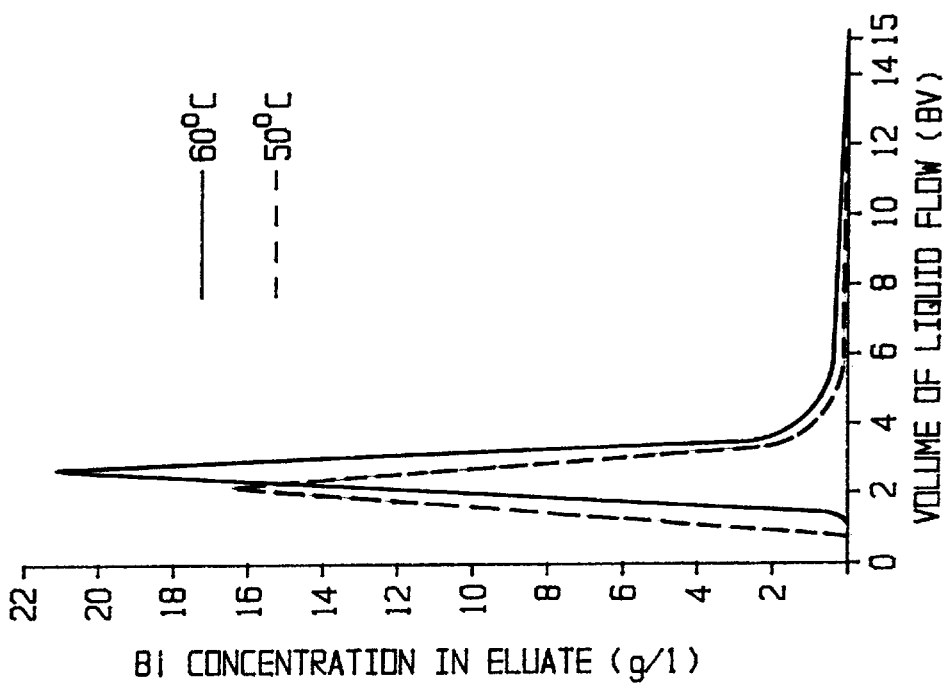
FIG. 8 is a graph that plots the relationship between the required volume of passed solution (BV) and concentration of bismuth eluate when a mixture of 30 g/l of sulfuric acid and 180 g/l of sodium chloride is used and passed up from the bottom of the column at 50° C. and 60° C.

FIG. 8 shows elution curves for this example obtained by passing the elute from the bottom of the column at 50° C. and 60° C.

Tables 8-1 and 8-2 show the elution rate for antimony and bismuth for each condition.

As can be seen in FIG. 7, when the eluant was passed down from the top of the column at 50° C., the high concentration portion of the curve shows only a 5% improvement than when it was passed from the top of the column at 40° C., however when passed at 50° C. the location of the concentration peak comes earlier. Accordingly it can be seen that if the eluant is passed at high temperature, elution is more efficient.

As can be seen in tables 8-1 and 8-2, if the eluant is passed through the column up from the bottom, the concentration in the high-concentration portion fo the curve is improved by 25% when compared to when the eluant was passed through the column down from the top. Also, when the volume of passed eluant reached BV 6, the bismuth was almost completely eluted, and it is possible to reduce the volume of eluant that must be passed through the column by passing the eluant through the column starting from the bottom when compared with passing it through the column starting at the top, thus making elution more efficient.

As can be seen in FIG. 8, when the eluant was passed through the column at 60° C., a 30% improvement could be seen in the high-concentration portion of the curve when compared with passing the eluant through the column at 50° C. Therefore elution can be performed more efficiently by passing the eluant through the column at 60° C.

From the results shown in tables 8-1 and 8-2, hardly any difference was seen in the elution rate for bismuth for any of the conditions, however depending on the conditions, by making the concentration of bismuth of the bismuth eluate with a high bismuth concentration even higher, it is possible to perform the electrolytic extraction, described below, more efficiently.

A high temperature is desired for the required flow temperature, and a temperature of 40° C. or greater is thought to be best, however there are limits when considering the cost involved in raising the temperature of the eluant and the material for the container. Moreover, when passing the eluant at high temperature through the column starting at the bottom. The elution rate of antimony tends to increase. However, when considering the maximum concentration of bismuth, if the eluant is passed at 60° C. through the column starting at the bottom, the bismuth concentration is at its highest and it is possible to perform elution with a small bed volume. Also, by reducing the amount of eluant passed through the column, it is possible to reduce the elution rate of antimony.

From these results, it was found that by eluting bismuth by passing the eluant at 40° C. to 60° C. through the column starting at the bottom using a volume of BV 10, it is possible to efficiently perform elution.

EXAMPLE 39

After the bismuth had been eluted in the same manner as was done in example 38, an eluant with a concentration of sulfuric acid of 250 g/l and a concentration of sodium chloride of 150 g/l was passed through the column and the antimony was eluted.

Figure 9:
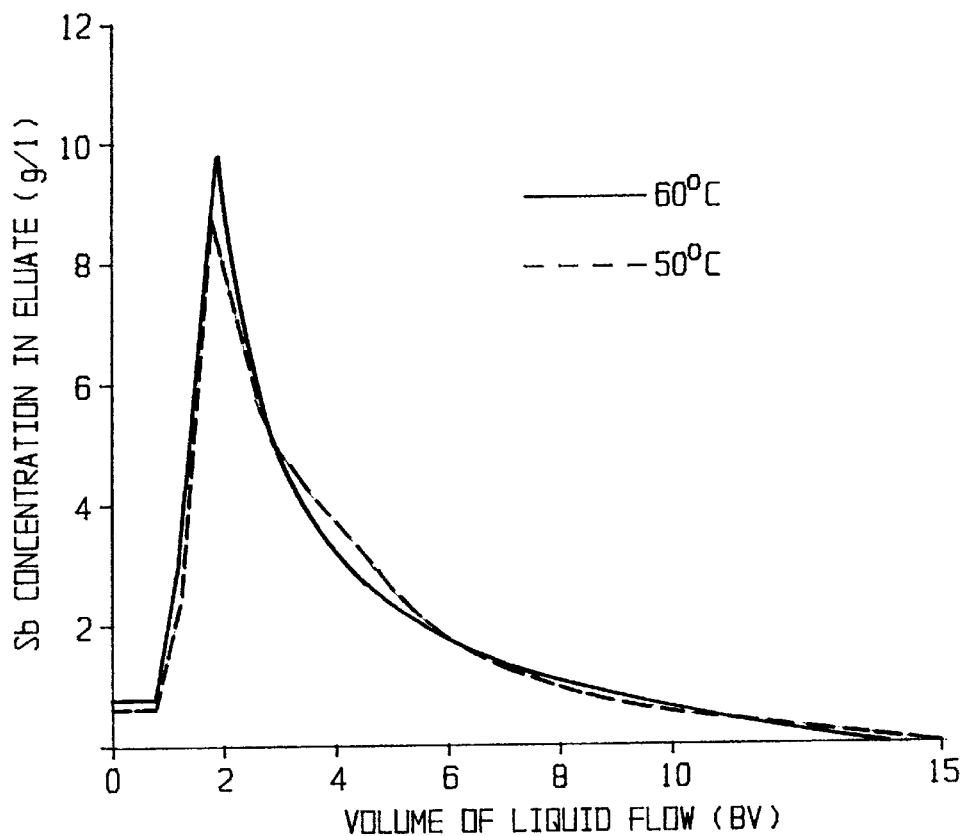
FIG. 9 is a graph that plots the relationship between the required volume of passed solution (BV) and concentration of antimony eluate when a mixture of 250 g/l of sulfuric acid and 150 g/l of sodium chloride is used and passed up from the bottom of the column at 50° C. and at 60° C., after the bismuth has been eluted by passing a mixture of 30 g/l of sulfuric acid and 180 g/l of sodium chloride up from the bottom of the column at 50° C. and 60° C. respectively.

FIG. 9 shows the elution curve obtained by passing the eluant through the column at 50° C. and 60° C. starting at the bottom of the column.

Tables 9-1 and 9-2 show the elution rate for antimony and bismuth for each condition.

As can be seen in FIG. 9, when the eluant was passed at 60° C. through the column starting from the bottom, there was a 10% increase in the concentration in the high-concentration portion of the curve when compared with when the eluant was passed through the column at 50° C. Also, from the results shown in tables 9-1 and 9-2, as in bismuth elution, when the eluant was passed through the column in a range of 40 to 60° C., it was possible to perform elution more efficiently. Moreover, in the bismuth elution process if there is 2 to 5 g/l of bismuth remaining in the resin, it is eluted in the following antimony elution process and so selectivity is lost.

From this it was found that if bismuth was eluted in the bismuth elution process until the final concentration of bismuth was 0.02 g/l or less, then in the antimony elution process, the concentration of bismuth in the antimony eluate was 0.01 g/l or less.

Furthermore, in the bismuth elution process, the last half of elution, or in other words the solution (Bi<0.5 g/l, Sb: 0.20 to 0.25 g/l) after the volume of required flow of eluant has reached BV 8 or more is reused in the first half of elution. On the other hand, if a solution having a concentration of antimony and bismuth that is 0.02 g/l or less was used in the last half of elution, it was found that there was an increase in the rate of antimony remaining in the bismuth elution process.

EXAMPLE 40

A mixture of 20 g/l of sulfuric acid and 120 g/l of sodium chloride was used to elute bismuth from the chelating resin (Epolas MX-2, manufactured by Miyoshi) to which the antimony and bismuth were adsorbed until the final concentration of bismuth was 0.02 g/l or less.

Next, the eluate obtained (Sb: 0.24 g/l, Bi: 5.3 g/l) was neutralized when 200 g/l of NaOH until it had a pH 1, then after removing the precipitate, the electrolysis equipment shown in FIG. 6 was used and the bismuth was recovered by performing constant-current electrolysis with a current density of 30 A/m2. The obtained results are shown in Tables 10-1 and 10-2. For comparison the case when electrolytic extraction was performed without adjusting the pH is also shown.

As shown in tables 10-1 and 10-2, by neutralizing the eluate to pH 1, it is possible to reduce the concentration of antimony, and reduce the amount of antimony contained in the recovered bismuth.

EXAMPLE 41

In the elution operation of example 40, after the bismuth had been eluted, a mixture of 250 g/l of sulfuric acid and 150 g/l of sodium chloride was used to elute the antimony.

Next, the antimony eluate solution obtained (Sb: 2.8 g/l, Bi: 0.009 g/l) was neutralized to PH 1 to 3 by adding a 200 g/l solution of NaOH.

The obtained results are shown in tables 11-1 and 11-2. The results obtained by performing hydrolysis and also when distilled water and NaOH were added at the same time are also shown.

As can be seen from tables 11-1 and 11-2, by making the final concentration of bismuth in the bismuth elution process 0.02 g/l or less, then there is hardly any bismuth remaining in the antimony eluate.

Also, if the concentration of bismuth in the antimony eluate is 0.02 g/l or less, then the amount of bismuth remaining in the recovered antimony is also very low.

Moreover, to obtain highly pure antimony, the eluate can be neutralized to pH 1 or hydrolysis can be performed, however there is the problem that amount of recovered material will be decreased. If antimony is precipitated out at pH 3, the amount of recovered material is large, however if the concentration of bismuth in the antimony eluate is high, the amount of bismuth contained in the recovered antimony is also high. Therefore, it is necessary to lower the concentration of bismuth in the antimony eluate.

EXAMPLE 42

In the electrolysis equipment shown in FIG. 6, a cathode made of niobium and an anode made of lead (both the cathode and anode are 65 mm×60 mm) are used, and they are separated by a positive ion exchange film (Neosceptor, manufactured by Tokuyama Sotatsu Co., Ltd.) where the distance between the film and an electrode plate is 30 mm. On the cathode side, the bismuth eluate obtained by the bismuth elution of example 36 was used, and on the anode side, sulfuric acid with a concentration of 200 g/l was used to perform bismuth electrolysis.

Table 12 shows the relationship between the electrolysis temperature, current density and current efficiency.

As shown in table 12, at the same current density, when the electrolysis temperature is high there is an improvement in current efficiency. Also, at the same electrolysis temperature, the current efficiency improves as the current density becomes higher. From these results it was found that in electrolytic extraction of bismuth it was desired to have a temperature of 40° C. or more and a current density of 50 A/m². However, in regards to the temperature, as was mentioned for example 38, it is best if the temperature is 60° C. or less. The purity of the bismuth her was 98% or more.

EXAMPLE 43

During elution of antimony, in order that the final concentration of bismuth in the bismuth elution process was 0.02 g/l or less, bismuth was eluted according to the conditions shown in table 13.

As can be seen in table 13, by performing elution with an eluant that has a concentration of 20 g/l of sulfuric acid and 180 g/l of sodium chloride, it is possible to make the concentration of bismuth in the antimony eluate 0.01 g/l or less. Also, with the eluant having a concentration of 20 g/l of sulfuric acid and 120 g/l of sodium chloride, by increasing the volume of required flow of solution BV it is possible to make the concentration of bismuth 0.01 g/l or less. However, increasing the volume of required flow BV requires processing large volumes of solution. Furthermore, even if using an eluant with a concentration of 20 g/l of sulfuric acid and 180 g/l of sodium chloride, when increasing the volume of required flow BV, it is necessary to decrease the volume of required flow BV in order that the volume of antimony elution increases.

Using an eluate having a concentration of bismuth of 0.01 g/l or less obtained through elution under the aforementioned conditions, constant-current electrolysis was performed at normal temperature in the same manner as described in example 42 using the electrolysis tank shown in FIG. 6. The results are shown in table 14.

As shown in table 14, by using an eluate having a concentration of bismuth of 0.01 g/l or less, it was possible to obtain highly pure antimony of 99.5% or more even when performing electrolysis at a high current density.

In other words, by keeping the concentration of bismuth in the antimony eluate to 0.01 g/l or less, highly pure antimony can be obtained through electrolysis, and it is possible to decrease the concentration of antimony in the solution at the end of electrolysis to 0.05 g/l or less, thus this final solution can be returned to the later half of elution in the chelating resin.

EXAMPLE 44

Using the electrolysis equipment shown in FIG. 6 as was done in example 42, and using an antimony eluate solution having a concentration of 5.1 g/l of Sb and 0.1 g/l of Bi obtained from the antimony elution process of example 37, electrolysis was performed with a current density of 30 A/m² and electrolysis temperatures 10° C., 25° C. and 40° C. Table 15 shows the relationship between the electrolysis temperature and current efficiency.

As can be seen in table 15, the current efficiency becomes higher as the temperature becomes lower. It is thought that because the antimony eluate solution has a high concentration of sulfuric acid of 250 g/l, the current efficiency became lower by re-dissolution of the precipitated antimony due to the increasing temperature.

From these results, it was found that for electrolytic extraction of antimony a temperature of 40° C. or less was suitable, and if it was in the range of 10° C. to 25° C., a current efficiency of 60% to 100% could be obtained.

EXAMPLE 45

Supposing that by using the electrolysis equipment shown in FIG. 6 as was done in example 42, the antimony eluate obtained in the antimony elution process of example 37 was supplied to the cathode side directly from the column, and supposing that a 2-stage cascade electrolysis tank was used, a solution having a concentration of 2.08 g/l of Sb and 0.005 g/l of Bi was supplied to the first-stage electrolysis tank and the first-stage electrolysis of antimony was performed at 40° C. at a constant voltage. Next, a solution having a concentration of 0.89 g/l of Sb and 0.0097 g/l of Bi was supplied to the second-stage electrolysis tank and the second-stage electrolysis was performed at 40° C. and at a constant voltage. The obtained results are shown in tables 16-1 and 16-2. As comparison examples, electrolytic extraction was performed using current densities of 30 A/m² and 50 A/m², and the results are also shown in tables 16-1 and 16-2.

As shown in tables 16-1 and 16-2, in the first stage of electrolysis, the current efficiency was higher in constant-voltage electrolysis than in constant-current electrolysis. Also, in the second stage of electrolysis, when electrolysis was performed at 1.8 V, a high current efficiency was obtained. Since the current efficiency drops as the voltage becomes higher, it is best if the voltage used in the second stage of electrolysis be 1.8 to 2.0 V.

From these results it was found that in electrolytic extraction of antimony, extraction can be performed more efficiently by performing constant-voltage electrolysis.

EXAMPLE 46

In the same way as was done in example 36, a solution of 20 g/l of sulfuric acid and 180 g/l of sodium chloride was used at 60° C. and passed through the column from the bottom at an SV of 0.5 to elute the bismuth from the chelating resin, to which the antimony and bismuth were adsorbed, until the volume of required flow was BV 15. Next a solution of 250 g/l of sulfuric acid and 150 g/l of sodium chloride was used and passed at 60° C. through the column from the bottom at an SV of 1.5 to elute the antimony until the volume of required flow was BV 15.

The high-concentration portion (Bi: 1.74 g/l, Sb: 0.07 g/l, volume of required flow: BV 2 to 5) of the bismuth eluate solution obtained from the bismuth elution process was used in the electrolysis equipment as shown in FIG. 6 of example 42 and electrolytic extraction was performed at 40° C. with a current density of 20 A/m².

Also, in the same way, the high-concentration portion (Sb: 3.43 g/l, Bi: 0.01 g/l, volume of required flow: BV 2 to 6) of the antimony eluate solution obtained from the antimony elution process was used to perform electrolytic extraction continuously in the first-stage electrolysis tank at 25° C. with a constant voltage of 2.2 V.

Furthermore, the drainage from the first-stage, constant-voltage electrolysis tank and the eluate portion from the antimony elution process after the volume of required flow BV was 7 to 15 were continuously passed to the second-stage electrolysis tank with a constant voltage of 1.8 V and electrolytic extraction was performed. The obtained results are shown in table 17-1 and 17-2.

From the results shown in tables 17-1 and 17-2, was found that by performing antimony elution under the above conditions it is possible to make the final concentration of bismuth in the bismuth elution process 0.02 g/l or less, and it is possible to make the maximum concentration of bismuth in the antimony elution process 0.01 g/l or less.

Moreover, in the eluate portion after a volume of required flow reached a BV of 5 to 6 or more (low-concentration eluate), the concentration of bismuth in the bismuth elution process and the concentration of antimony in the antimony elution process are 0.5 g/l or less and it can be reused as is in the first half of elution.

By using the highly concentrated portion of bismuth eluate solution obtained in the bismuth elution process under the above conditions in performing electrolytic extraction, it is possible to reduce the final concentration of bismuth to 0.02 g/l at a current efficiency of 50%. Moreover, the drainage from this electrolysis can be returned to the later half of bismuth elution.

By continuously performing the second-stage electrolytic extraction using the antimony eluate solution obtained from the antimony elution process under the above conditions, it is possible to reduce the final concentration to 0.02 g/l at a current efficiency of 70%. Also, the drainage of this electrolysis can be reused in the later half of antimony elution.

EXAMPLE 47

Using the electrolysis equipment as shown in FIG. 6, a 200 g/l sulfuric acid solution is contained on the anode side, and a mixture of sulfuric acid and sodium chloride with a concentration of Sb of 4.3 g/l and Bi of 6.6% is contained on the cathode side, and constant-voltage electrolysis was performed at 2.2 V and normal temperature. The Sb recovered was 41.0% and the Bi recovered was 52.6%, and the current efficiency was 57.1%.

Figure 10:
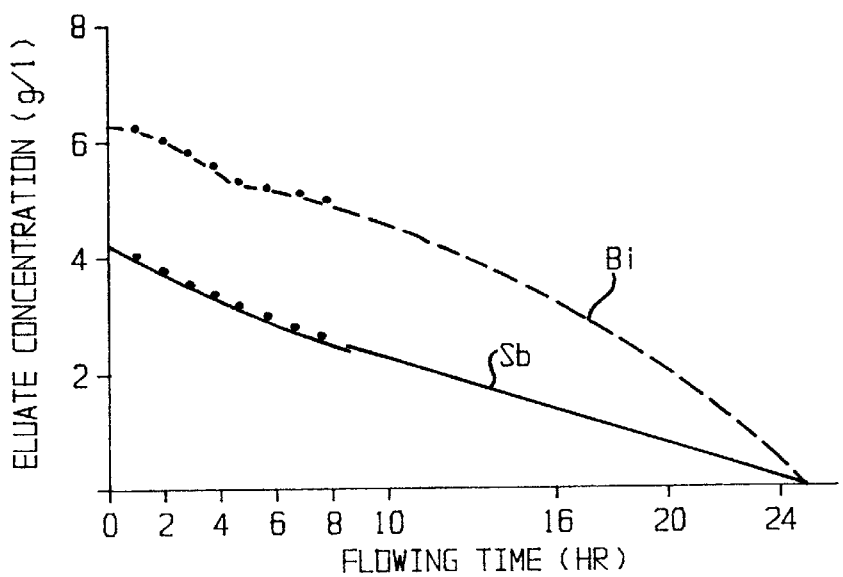
FIG. 10 is a graph showing the relationship between the concentrations of antimony and bismuth in the eluate solution and the time of current flow.

FIG. 10 shows the relationship between the amount of time that current flowed and the concentration of antimony and bismuth in the eluate.

As shown in FIG. 10, it was found that as current flows over time the concentration of antimony and bismuth drops, and that the metals are deposited on the cathode and can be recovered from the eluate.

The grade of the antimony and bismuth changes depending on their concentration in the eluate before electrolysis.

Furthermore, if the ratio of concentration Sb/Bi in the eluate is 1:1, then the ratio of the grade of recovered materials, Sb/Bi, is also 1:1.

TABLE 6-1

|   | $H_2SO_4$ (g/l) | NaCl (g/l) | BV | SV | Elution temperature (° C.) |
|---|---|---|---|---|---|
| 1 | 30 | 120 | 15 | 3.0 | 40 |
| 2 | 60 | 120 | 16 | 3.0 | 40 |

TABLE 6-1-continued

|   | $H_2SO_4$ (g/l) | NaCl (g/l) | BV | SV | Elution temperature (° C.) |
|---|---|---|---|---|---|
| 3 | 100 | 180 | 20 | 3.0 | 40 |
| 4 | 30 | 180 | 10 | 3.0 | 40 |
| 5 | 30 | 120 | 10 | 3.0 | 50 |
| 6 | 30 | 120 | 15 | 1.5 | 50 |
| 7 | 30 | 180 | 20 | 1.5 | 50 |
| 8 | 20 | 120 | 10 | 0.5 | 60 |

TABLE 6-2

|   | Sb Adsorbed amount (g/R-L) | Bi Adsorbed amount (g/R-L) | Sb Elution rate (%) | Bi Elution rate (%) | Ratio of eluted amounts |
|---|---|---|---|---|---|
| 1 | 40.04 | 27.49 | 5.3 | 95.4 | 12.26 |
| 2 | 34.69 | 24.45 | 18.0 | 100.0 | 3.89 |
| 3 | 33.91 | 24.92 | 85.8 | 89.5 | 0.85 |
| 4 | 36.65 | 27.22 | 15.5 | 97.1 | 4.66 |
| 5 | 37.65 | 25.20 | 5.8 | 99.0 | 11.45 |
| 6 | 33.65 | 25.78 | 9.0 | 91.8 | 7.84 |
| 7 | 29.53 | 14.55 | 23.7 | 100.0 | 2.08 |
| 8 | 27.42 | 18.63 | 6.0 | 73.5 | 8.30 |

TABLE 7-1

|   | $H_2SO_4$ (g/l) | NaCl (g/l) | BV | SV | Elution temperature (° C.) |
|---|---|---|---|---|---|
| 11 | 100 | 180 | 10 | 3.0 | 40 |
| 12 | 200 | 60 | 10 | 3.0 | 40 |
| 13 | 200 | 120 | 10 | 3.0 | 50 |
| 14 | 200 | 120 | 15 | 1.5 | 50 |
| 15 | 250 | 150 | 20 | 1.5 | 50 |
| 16 | 250 | 150 | 15 | 1.5 | 60 |

TABLE 7-2

| | Bismuth elution process | | Antimony elution process | | |
|---|---|---|---|---|---|
| | Sb Amount remaining on resin (g/R-L) | Bi Amount remaing on resin (g/R-L) | Sb Elution rate (%) | Bi Elution rate (%) | Ratio of eluted amounts |
| 11 | 28.62 | 4.85 | 77.9 | 100.0 | 4.60 |
| 12 | 30.98 | 0.80 | 15.4 | 100.0 | 5.85 |
| 13 | 35.47 | 0.24 | 78.0 | 100.0 | 115.30 |
| 14 | 30.63 | 2.11 | 100.0 | 25.1 | 57.79 |
| 15 | 21.80 | 0.11 | 79.0 | 100.0 | 191.6 |
| 16 | 25.77 | 4.93 | 83.3 | 16.2 | 26.8 |

TABLE 8-1

| | | Bismuth elution process ($H_2SO_4$ 30 g/l, NaCl 180 g/l) | |
|---|---|---|---|
| Direction of required flow | Temperature of required flow (° C.) | Sb Elution rate (%) | Bi Elution rate (%) |
| From the top | 40 | 15.5 | 94.5 |
| From the top | 50 | 23.7 | 96.1 |
| From the bottom | 50 | 16.3 | 99.4 |
| From the bottom | 50 | 24.0 | 99.5 |

TABLE 8-2

| Direction of required flow | Maximum Bi concentration (g/l) | Average Sb concentration (g/l) |
|---|---|---|
| From the top | 12.4 | 0.20 |
| From the top | 13.0 | 0.25 |
| From the bottom | 16.4 | 0.40 |
| From the bottom | 21.0 | 0.65 |

TABLE 9-1

Bismuth elution process
$H_2SO_4$ 30 g/l, NaCl 180 g/l

| Direction of required flow | Elution temperature (° C.) | BV | Percentage of remaining Sb (%) | Percentage of remaining Bi (%) | Final Bi concentratiON (g/l) |
|---|---|---|---|---|---|
| From the top | 50 | 20 | 73.8 | 0.7 | 0.21 |
| From the top | 60 | 10 | 73.6 | 30.0 | 0.65 |
| From the top (1) | 60 | 15 | 82.1 | 5.3 | 0.13 |
| From the bottom | 50 | 10 | 70.6 | 20.5 | 0.82 |
| From the bottom | 60 | 15 | 75.6 | 0.6 | <0.01 |
| From the bottom (2) | 60 | 15 | 88.7 | 9.6 | 0.02 |

TABLE 9-2

Antimony elution process (SV 1.5)

| Direction of required flow | Sb elution rate (%) | Bi elution rate (3) (%) | Maximum Bi concentration (g/l) |
|---|---|---|---|
| From the top | 99.0 | 100.0 | 0.15 |
| From the top | 83.0 | 16.2 | 0.82 |
| From the top (1) | 94.7 | 100.0 | 0.15 |
| From the bottom | 89.9 | 32.9 | 0.98 |
| From the bottom | 100.0 | 100.0 | <0.01 |
| From the bottom (2) | 96.4 | 100.0 | 0.01 |

(1) Eluate with a concentration of Sb of 0.2 g/l is used again.
(2) Eluate with a concentration of Sb of 0.25 g/l is used again.
(3) The elution rate when the percentage of Bi remaining in the bismuth elution process is taken to ba 100.

TABLE 10-1

| | Original solution | | After pH adjustment | |
|---|---|---|---|---|
| | Sb(g) | Bi(g) | Sb(g) | Bi(g) |
| pH adjustment | 0.24 | 5.53 | 0.14 | 5.00 |
| No pH adjustment | 0.30 | 2.80 | — | — |

TABLE 10-2

| | After electrolytic extraction | | Grade of recovered materials (%) | | |
|---|---|---|---|---|---|
| | Sb(g) | Bi(g) | Sb | Bi | O |
| pH adjustment | 0.015 | 0.53 | 2.7 | 87.0 | 6.7 |
| Deposition by Neutralization | | | 44.6 | 14.2 | 18.1 |
| No pH adjustment | 0.033 | 0.33 | 8.5 | 82.4 | 3.3 |

TABLE 11-1

| Processing | pH | Original solution | | After processing | | Recovered materials(g) |
|---|---|---|---|---|---|---|
| | | Sb(g) | Bi(g) | Sb(g) | Bi(g) | |
| Neutralization | 1 | 1.42 | 0.0045 | 0.59 | 0.0052 | 0.86 |
| Neutralization | 2 | 1.42 | 0.0045 | 0.21 | 0.0043 | 1.74 |
| Neutralization | 3 | 1.42 | 0.0045 | 0.13 | 0.0031 | 2.10 |
| Hydrolysis | 1 | 3.00 | 0.010 | 1.86 | 0.0062 | 1.20 |

TABLE 11-1-continued

| Processing | pH | Original solution | | After processing | | Recovered materials(g) |
|---|---|---|---|---|---|---|
| | | Sb(g) | Bi(g) | Sb(g) | Bi(g) | |
| Water + NaOH | 2 | 3.04 | 0.011 | 0.87 | 0.0032 | 2.28 |
| Water + NaOH | 3 | 3.04 | 0.011 | 0.16 | 0.0015 | 3.01 |

TABLE 11-2

| Processing | Grade of recovered materials (%) | | |
|---|---|---|---|
| | Sb | Bi | O |
| Neutralization | 72.1 | 0.04 | 17.0 |
| Neutralization | 73.4 | 0.13 | 17.0 |
| Neutralization | 74.0 | 0.33 | 17.0 |
| Hydrolysis | 72.5 | 0.03 | 17.0 |
| Water + NaOH | 73.5 | 0.15 | 17.0 |
| Water + NaOH | 74.0 | 0.31 | 17.0 |

TABLE 12

| Starting Bi concentration (g/l) | Electrolysis temperature (° C.) | Current density (A/m$^2$) | Final Bi concentration (g/l) | Current efficiency (%) |
|---|---|---|---|---|
| 5.10 | 10 | 20 | 0.58 | 57.5 |
| 5.10 | 10 | 40 | 0.42 | 59.0 |
| 5.10 | 10 | 50 | 0.53 | 67.0 |
| 1.74 | 10 | 30 | 0.49 | 39.0 |
| 1.74 | 25 | 30 | 0.33 | 45.5 |
| 1.74 | 40 | 30 | 0.38 | 44.5 |

TABLE 13

| SV 0.5 | | | Final Bi Conc. | Eluted amount of | Bi Conc. |
|---|---|---|---|---|---|
| $H_2SO_4$ (g/l) | NaCl (g/l) | BV (g/l) | (g/R–L) | Sb (g/l) | in Sb eluate |
| 20 | 120 | 16 | 0.034 | 2.57 | 0.022 |
| 20 | 120 | 10 | 0.12 | 1.64 | 0.074 |
| 20 | 180 | 30 | 0.0062 | 9.80 | 0.0065 |
| 20 | 180 | 20 | 0.0054 | 7.01 | 0.0064 |
| 20 | 180 | 15 | 0.0056 | 5.09 | 0.0039 |

TABLE 14

| Current density ($A/ms^2$) | Final Sb concentration (g/l) | Final Bi concentration (g/l) | Bi content (%) | Sb purity (%) |
|---|---|---|---|---|
| 20 | 0.04 | 0.009 | 0.42 | 99.6 |
| 30 | 0.02 | 0.007 | 0.23 | 99.6 |
| 50 | 0.05 | 0.007 | 0.22 | 99.6 |

TABLE 15

| Electrolysis temperature (° C.) | Current efficiency (%) |
|---|---|
| 10 | 98.5 |
| 25 | 62.0 |
| 40 | 47.0 |

TABLE 16-1

| | Average voltage (V) | Average current density ($A/m^2$) |
|---|---|---|
| Cascade First stage | | |
| Rated voltage 2.2 V | — | 37.5 |
| Rated current 30 $A/m^2$ | 2.19 | — |
| Rated current 50 $A/m^2$m | 2.22 | — |
| Cascade second stage | | |
| Rated voltage 1.8 V | — | 7.1 |
| 2.0 V | — | 15.1 |
| 2.2 V | — | 33.0 |
| 2.5 V | — | 65.7 |

TABLE 16-2

| | Sb concentration (g/l) | Bi concentration (g/l) | Final current efficiency (%) | Final |
|---|---|---|---|---|
| Cascade First stage | | | | |
| Rated voltage 2.2 V | | 0.68 | 0.033 | 59.2 |
| Rated current 30 $A/m^2$ | | 0.38 | 0.01 | 34.0 |
| Rated current 50 $A/m^2$ | | 0.33 | 0.66 | 37.0 |
| Cascade Second stage | | | | |
| Rated voltage 1.8 V | | 0.32 | 0.009 | 84.3 |
| 2.0 V | | 0.27 | 0.007 | 41.6 |
| 2.2 V | | 0.07 | 0.008 | 25.4 |
| 2.5 V | | 0.04 | 0.005 | 13.1 |

TABLE 17-1

| | Elution process | | | | | |
|---|---|---|---|---|---|---|
| | Elution rate | | Low-conc. side | | Final Bi | Maximum Bi |
| | Sb (%) | Bi (%) | Sb conc. (g/l) | Bi conc. (g/l) | conc. (g/l) | conc. (g/l) |
| First stage | 16.1 | 99.6 | 0.40 | 0.10 | 0.02 | — |
| Second stage | 81.2 | 0.4 | 0.35 | 0.003 | — | 0.01 |

TABLE 17-2

| | Electrolytic extraction process | | |
|---|---|---|---|
| | Final concentration | | |
| | Sb (g/l) | Bi (g/l) | Current efficiency (%) |
| First stage | 0.0033 | 0.0054 | 50.9 |
| Second stage | 0.02 | 0.007 | 69.6 |

With this invention, a mixture of sulfuric acid and sodium chloride is used to selectively recover antimony and bismuth from a chelating resin that has adsorbed the antimony and bismuth in a copper electrolyte, and through electrolysis these metals can be recovered. Also, by adjusting the pH before electrolysis, it is possible to improve the purity of the recovered antimony and bismuth.

What is claimed is:

1. A method of selectively recovering antimony and bismuth from a copper electrolyte comprising the steps of:
   (1) reducing $Fe^{3+}$ ions existing in the copper electrolyte to $Fe^{2+}$ ions by bringing the copper electrolyte into contact with metallic copper;
   (2) adsorbing the antimony and bismuth in the electrolyte onto a chelating resin by bringing the reduced solution obtained in step (1) in contact with the chelating resin;
   (3) washing the chelating resin with water;
   (4) obtaining a bismuth eluate in a bismuth elution process by eluting the bismuth by bringing a bismuth eluant solution containing a mixture of sulfuric acid at 20 to 30 g/l and sodium chloride at 120 to 180 g/l into contact with the washed chelating resin at a temperature of 40 to 60° C.;
   (5) obtaining an antimony eluate in an antimony elution process by eluting the antimony by bringing an antimony eluant solution containing a mixture of sulfuric acid at 100 to 250 g/l and sodium chloride at 120 to 180 g/l into contact with the chelating resin at a temperature between 40° C. and 60° C. after the bismuth has been eluted.

2. The method of selective recovery of claim 1, wherein a column is used when bringing the copper electrolyte into contact with the chelating resin.

3. The method of selective recovery of claim 1, wherein the antimony is eluted by passing the antimony eluant solution through the column from the bottom.

4. The method of selective recovery of claim 1, wherein the bismuth is eluted by passing the bismuth eluant solution through the column from the bottom.

5. The method of selective recovery of claim 1, wherein a bismuth eluate portion obtained in the bismuth elution process having a bismuth concentration of 0.5 g/l or less is used as the bismuth eluant in the bismuth elution step.

6. The method of selective recovery of claim 1, wherein the bismuth elution process has a first half and a second half and wherein an eluant portion obtained in the bismuth elution process having a bismuth concentration of 0.02 g/l or less is used as the bismuth eluant solution in the second half of the bismuth elution process.

7. The method of claim 1, wherein the antimony elution process has a first half and a second half and wherein a eluant portion having a concentration of antimony of 0.02 g/l or less is returned as the eluant solution in the second half of the bismuth elution process and/or antimony elution process.

8. The method of claim 1, wherein the eluant is passed through the chelating resin until the concentration of bismuth in the eluant is 0.02 g/l or less.

9. The method of claim 1 wherein bismuth is recovered by electrolytic extraction wherein an anode and a cathode are provided and the anode and cathode are separated from each other by a positive ion exchange film, and wherein the bismuth eluate is put into the cathode side as the bismuth electrolyte and sulfuric acid is put into the anode side as a sulfuric acid bath, and where the bismuth in the bismuth electrolyte is electrolytically extracted as metallic bismuth.

10. The method of selective recovery by electrolyte extraction of claim 9 wherein the bismuth eluate having a bismuth concentration of 0.5 g/l or more is used as the bismuth electrolyte and where electrolytic extraction is performed using constant-current electrolysis at 20 to 50 A/m$^2$ until the concentration of bismuth in the electrolyte becomes 0.02 g/l or less.

11. The method of claim 1 wherein antimony is recovered by electrolytic extraction wherein an anode and a cathode are provided and wherein the anode and cathode are separated from each other by a positive ion exchange film and wherein the antimony eluate is put into the cathode side as an antimony electrolyte and sulfuric acid is put into the anode side as a sulfuric acid bath, and where the antimony in the antimony electrolyte is recovered as metallic antimony by electrolytic extraction.

12. The method of antimony recovery of claim 11, wherein the temperature of electrolysis in the antimony electrolytic extraction step is 40° C. or less.

13. The method of antimony recovery of claim 11, wherein the electrolysis step comprising a first-stage electrolysis process where the tank voltage is maintained at 2.2 to 2.5 V, and a second-stage electrolysis process where the tank voltage is maintained at 1.8 to 2.0 V.

14. The method of antimony recovery of claim 13, wherein an antimony eluate having a Sb/Bi concentration ratio of 20 or more is 1 is put into the first-stage electrolysis process to electrolytically extract the antimony, and wherein the extracted solution from the first-stage electrolysis process is put into the second-stage electrolysis process.

15. The method of antimony recovery of claim 14, wherein the antimony eluate having a Sb/Bi concentration ratio less than 20 to 1 is put into the second-stage electrolysis process.

16. A method of selectively recovering antimony and bismuth from a copper electrolyte solution comprising the following steps:
(1) reducing $Fe^{3+}$ ions existing in the copper electrolyte to $Fe^{2+}$ ions by bringing the copper electrolytic solution into contact with metallic copper that has been placed in a column
(2) bringing the copper electrolyte obtained in step (1) into contact with a chelating resin that has been placed in a column to adsorb the antimony and bismuth in the copper electrolyte and then washing the chelating resin inside the column by passing warm water through the column from the top.
(3) selectively eluting bismuth in a bismuth eluting step from the chelating resin that has adsorbed the antimony and bismuth in step (2) by passing an eluant solution of 20 to 30 g/l of sulfuric acid and 120 to 180 g/l of sodium chloride over the chelating resin at 40 to 60° C. said bismuth eluting step having a first half and a second half;
(4) eluting antimony that remains on the chelating resin after the bismuth has been eluted in step (3) by passing an eluant solution of 100 to 250 g/l of sulfuric acid and 120 to 180 g/l of sodium chloride over the chelating resin at 40 to 60° C.

17. The method of selective recovery of claim 16, wherein an eluant solution containing sulfuric acid and sodium chloride is passed through the column from the bottom to elute the bismuth.

18. The method of selective recovery of claim 16, wherein an eluant solution containing sulfuric acid and sodium chloride is passed through the column from the bottom to elute the antimony.

19. The method of claim 16 wherein antimony and bismuth is selectively recovered by electrolysis, wherein an anode and a cathode is provided and wherein the anode and cathode are separated from each other by a positive ion exchange film and wherein a sulfuric acid bath is provided on the cathode side, to perform an electrolytic extraction on a eluant solution selected from the group of bismuth eluate solution and antimony eluate solution to recover either metallic bismuth or metallic antimony.

20. The method of claim 16 wherein eluate solution having a concentration of bismuth of 0.5 g/l or less is used as the eluate in the first half of the bismuth elution step.

21. The method of selective recovery of claim 16, wherein the bismuth eluant solution is passed through the column until the concentration of bismuth extracted from the chelating resin is 0.02 g/l or less, and wherein the concentration of the antimony in the antimony eluate solution is 0.01 g/l or less.

22. The method of claim 19, wherein exhausted bismuth electrolytic solution is returned to be used as the eluant in the second half of the bismuth eluting step when the concentration of bismuth in the bismuth electrolytic solution becomes 0.02 g/l or less.

23. The method of claim 19, wherein exhausted antimony electrolytic solution is returned to be used as the eluant in the second half of the bismuth elution step or the antimony elution step when the concentration of antimony in the electrolytic solution becomes 0.02 g/l or less.

24. The method of claim 19 wherein the concentration of bismuth in the bismuth eluate solution is 0.5 g/l or more, and 20 to 50 A/m² constant-current electrolysis is performed on this bismuth eluate solution until the concentration of bismuth in the electrolyte is 0.02 g/l or less.

25. The method of claim 19 wherein the antimony eluate solution having a concentration of at least 0.01 g/l of antimony is continuously supplied to the anode so that the antimony is electrolytically extracted.

26. The method of claim 25 wherein re-dissolving of antimony is reduced by performing electrolysis at a temperature below 40° C.

27. The method of claim 25 wherein a two-stage electrolysis tank is used to electrolytically extract antimony, and wherein the tank voltage of the first stage is maintained at 2.2 to 2.5 V, while the tank voltage of the second stage is maintained at 1.8 to 2.0 V.

28. The method of claim 27 wherein antimony is electrolytically extracted by putting the antimony eluate solution having a Sb/Bi concentration ratio of 20 or more to one into the first-stage electrolysis tank, and wherein the spent electrolysis solution of the first-stage electrolysis is put into the second-stage electrolysis tank.

29. The method of claim 28 wherein re-dissolving of antimony is reduced by performing electrolysis at a temperature below 40° C.

30. The method of claim 27 wherein the antimony eluate solution having a Sb/Bi concentration ratio of 20 or less to one is put into the second-stage electrolysis tank so that electrolytic extraction is performed.

31. The method of claim 30 wherein re-dissolving of antimony is reduced by performing electrolysis at a temperature below 40° C.

32. The method of claim 27 wherein re-dissolving of antimony is reduced by performing electrolysis at a temperature below 40° C.

33. A method of recovering Sb and Bi from a copper electrolyte comprising the steps of:

immersing copper metal in the copper electrolyte containing the impurities Sb, Bi, and Fe in order to reduce $Fe^{3+}$ ions;

adjusting the oxidation-reduction potential of the copper electrolyte to reduce the $Fe^{3+}$ to $Fe^{2+}$;

bringing the copper electrolyte into contact with a chelating resin in order to adsorb the Sb and Bi;

contacting the chelating resin with an eluant solution, said eluant solution being selected from the group consisting of solutions of sodium chloride and sulfuric acid and solutions of thiourea and sulfuric acid to elute Bi selectively with respect to Sb and other metals;

sequentially eluting Bi and Sb from the chelating resin and recovering Sb and Bi.

34. The method of recovering Sb and Bi from the copper electrolyte of claim 33, wherein the eluant solution containing sodium chloride and sulfuric acid has a concentration of sodium of 60 to 180 g/l and a concentration of sulfuric acid of 30 to 200 g/l and wherein the temperature is 10 to 60° C.

35. The method of recovering Sb and Bi from the copper electrolyte of claim 33, wherein the eluant solution containing thiourea and sulfuric acid has a concentration of thiourea of 5 to 20 g/l and a concentration of sulfuric acid of 25 to 300 g/l, and wherein the temperature is 25 to 60° C.

* * * * *